United States Patent
Israni et al.

(10) Patent No.: US 9,125,422 B2
(45) Date of Patent: Sep. 8, 2015

(54) KICKER DEVICE AND METHOD OF USING THE SAME

(71) Applicants: Pranoti Nagarkar Israni, Singapore (SG); Rishi Israni, Singapore (SG); Jui Ajit Chitale, Singapore (SG); Ali Syed Muhammad Baber, Singapore (SG)

(72) Inventors: Pranoti Nagarkar Israni, Singapore (SG); Rishi Israni, Singapore (SG); Jui Ajit Chitale, Singapore (SG); Ali Syed Muhammad Baber, Singapore (SG)

(73) Assignee: Zimplistc Pte. Ltd., Singapore (SG)

( * ) Notice: Subject to any disclaimer, the term of this patent is extended or adjusted under 35 U.S.C. 154(b) by 0 days.

(21) Appl. No.: 14/582,153

(22) Filed: Dec. 23, 2014

(65) Prior Publication Data

US 2015/0181895 A1    Jul. 2, 2015

Related U.S. Application Data

(63) Continuation-in-part of application No. 14/445,122, filed on Jul. 29, 2014.

(30) Foreign Application Priority Data

Dec. 26, 2013   (SG) ................. 2013096151

(51) Int. Cl.
*A21C 9/08* (2006.01)
*A21C 1/00* (2006.01)
*A21C 1/14* (2006.01)
*A21C 11/00* (2006.01)

(52) U.S. Cl.
CPC ................. *A21C 9/085* (2013.01); *A21C 1/003* (2013.01); *A21C 1/1425* (2013.01); *A21C 1/1455* (2013.01); *A21C 9/08* (2013.01); *A21C 11/006* (2013.01)

(58) Field of Classification Search
CPC ...... A21C 1/1455; A21C 1/146; A21C 1/145; A21C 9/08
USPC ................. 99/349, 352, 353, 373, 443 C, 334
See application file for complete search history.

(56) References Cited

U.S. PATENT DOCUMENTS

| | | | | |
|---|---|---|---|---|
| 2,275,341 A * | 3/1942 | Brabender | ................... | 73/169 |
| 3,788,030 A * | 1/1974 | Moline | ................... | 53/514 |
| 3,937,852 A * | 2/1976 | Wolf | ................... | 426/560 |
| 3,966,973 A * | 6/1976 | Henry et al. | ................... | 426/231 |
| 4,281,025 A * | 7/1981 | Longenecker | ................... | 426/496 |
| 4,758,778 A * | 7/1988 | Kristinsson | ................... | 324/692 |
| 5,091,202 A * | 2/1992 | Hayashi | ................... | 426/496 |
| 5,611,420 A * | 3/1997 | Heim et al. | ................... | 198/371.2 |
| 6,060,090 A * | 5/2000 | Banella et al. | ................... | 426/20 |
| 8,820,221 B2 | 9/2014 | Israni | | |
| 2003/0148010 A1* | 8/2003 | Keese et al. | ................... | 426/505 |
| 2004/0094539 A1* | 5/2004 | Kim | ................... | 219/679 |
| 2008/0138480 A1* | 6/2008 | Bows et al. | ................... | 426/465 |
| 2008/0141874 A1* | 6/2008 | Schultz et al. | ................... | 100/334 |
| 2012/0237644 A1* | 9/2012 | Luckhardt et al. | ................... | 426/231 |
| 2012/0321770 A1* | 12/2012 | Pelle | ................... | 426/505 |

* cited by examiner

*Primary Examiner* — Dana Ross
*Assistant Examiner* — Lawrence Samuels
(74) *Attorney, Agent, or Firm* — Geeta Kadambi; Riddhi IP LLC

(57) ABSTRACT

A kicker unit and the method of using the kicker unit are described. The kicker unit along with its sensor, motor and embedded software makes this novel invention to self-guide the movement of the flattened dough from flattening platen to cooking platen. The sensor and motor based movement control of the kicker enables the flattened dough to successfully move without being disfigured and remain round and flat. The curved shape of the kicker base enables the flattened dough to be transported in good shape.

11 Claims, 3 Drawing Sheets

KICKER DEVICE AND METHOD OF USING THE SAME

CROSS RELATED APPLICATIONS

This application claims priority to a Provisional Application No. 2013096151 filed on Dec. 26, 2013 in Singapore and now U.S. Utility application Ser. No. 14445122 filed on 29 Jul. 2014 are hereby incorporated by reference in its entireties for all of its teachings.

FIELD OF THE INVENTION

This disclosure relates generally to a kicker device used for moving the flattened dough from one destination to another.

BACKGROUND

Transfer of dough products is mostly done using conveyor belts in dough processing machines where the dough products do not move but the surface it is sitting on moves to transfer the dough products. The reason being is that dough products tend to stick onto the surface. However, portable food preparation appliances cannot afford to have conveyor belts which would affect the compactness of its design and increase the cleaning requirements as accessibility in compact devices is restricted. There is a need for a newer device to make the cooking device compact.

SUMMARY OF INVENTION

The present invention comprises of a kicker unit, linear system, two platens with a software that controls the movement of the kicker and the placement of the flattened dough from first position on the flattening pan (first pan) to the final position on the cooking pan (second platen) and a method for detecting sticking and transferring flattened dough. The objective of the invention is thus to devise a method for detecting the stickiness and to overcome the stickiness by heating the platens and then moving the flattened dough effectively.

In one embodiment, a kicker, a slide bar, and two platens are disclosed as a unit for transferring the flattened dough from first position to the final position. In one embodiment the specific shape of the kicker may be straight, customized or curved. In another embodiment, the kicker has a curved shape that matches the circumference of the flattened dough. The kicker also houses an encoder, sensor, and a motor to control the movements of the kicker.

In one embodiment, a slide bar is present. The slide bar is made up of two components. The rails support the kicker and the grooves allow the kicker to travel back and forth. In one embodiment, the curved surface of the kicker is made up of heat resistant material. The kicker is close to the first platen and the second platen.

The kicker has multiple movements before the flattened dough reaches its final destination. In another embodiment, dough ball is flattened in the first pan. Once it is flattened the first movement of the kicker happens. The curved part of the kicker touches the outer ridge of the flattened dough to measure the first resistance.

In one embodiment, the encoder, measures the distance traveled by the kicker. In another embodiment, increase or decrease of power drawn by the motor depending on the rate of change in the motion by the motor.

In one embodiment, as a method of using the kicker, the kicker has the first contact with the flattened dough to measure the resistance which indicates the stickiness of the product. The sensor and motor help determine the next step based on the feedback after measuring the resistance as to increase or decrease in motor power to move the flattened dough. In another embodiment, the heat of the first platen is modulated to decrease the stickiness of the flattened dough and reducing the moisture in the flattened dough.

In one embodiment, the second move by the kicker to locate the flattened dough from first position t final position is done using more force if the resistance is high and less force if the stickiness is low.

Other features and advantages will be apparent from the detailed description, taken in conjunction with the accompanying drawings, which illustrate, by way of example, the principles of the current apparatus and method.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from accompanying drawings and from the detailed description that follows.

DETAILED DESCRIPTION

Due to flour variations, and limitations of proportion control and manufacturing and assembly tolerances, there is a need for sticking detection, and to adjust the parameters accordingly once sticking is detected. The instant kicker device can be a standalone product that may be used in any food production unit that require transferring a flat edible object from one place to another or part of a compact flat bread making machine that provides one dough ball at a time and is flattened right away.

Figure 1:
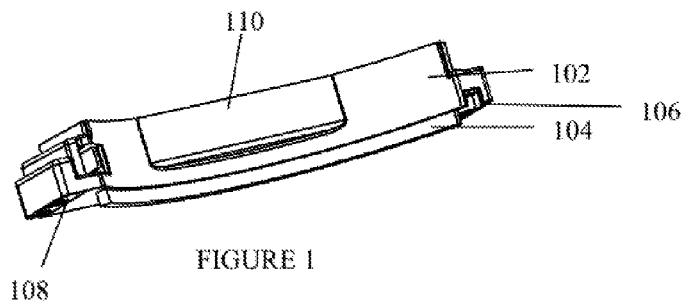
FIG. 1 shows a perspective view of a kicker.

FIG. 1 shows kicker 102, having a back support 110, housing a motor 106, sensor 108 and the curved kicker 104 having a specific shape and a specific surface at the lower end of the encasing of the motor, sensor and back support. The specific shape of the curved kicker enables the curved flattened dough to be moved. The specific surface is heat resistant and non-stick in nature. The curvature of the curved kicker is designed to match the flattened dough that is obtained by flattening the dough ball of measured quantity. The specific location is right in the center of the cooking platen (first platen). The kicker may have a specific shape and structure. In one embodiment the specific shape of the kicker may be straight, customized or curved.

Figure 2:
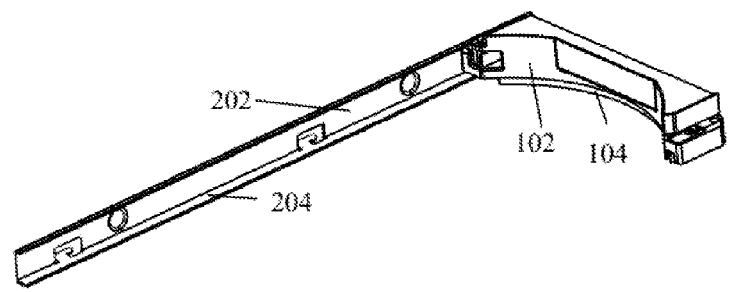
FIG. 2 shows a slide bar that enables the kicker to travel back and forth.

FIG. 2 shows the a linear system 202 that houses a rail 204, an actuator and an encoder (not shown) that measures at least one of a resistance, distance travelled and change in rate of motion of the flattened dough during a forward and backward movement of the curved kicker to move the flattened dough to the cooking platen unit (second platen). The rail allows the kicker to move back and forth over the first platen and the second platen. This figure also shows that the kicker is attached to the linear system to cover the entire length of the platens.

Figure 3:
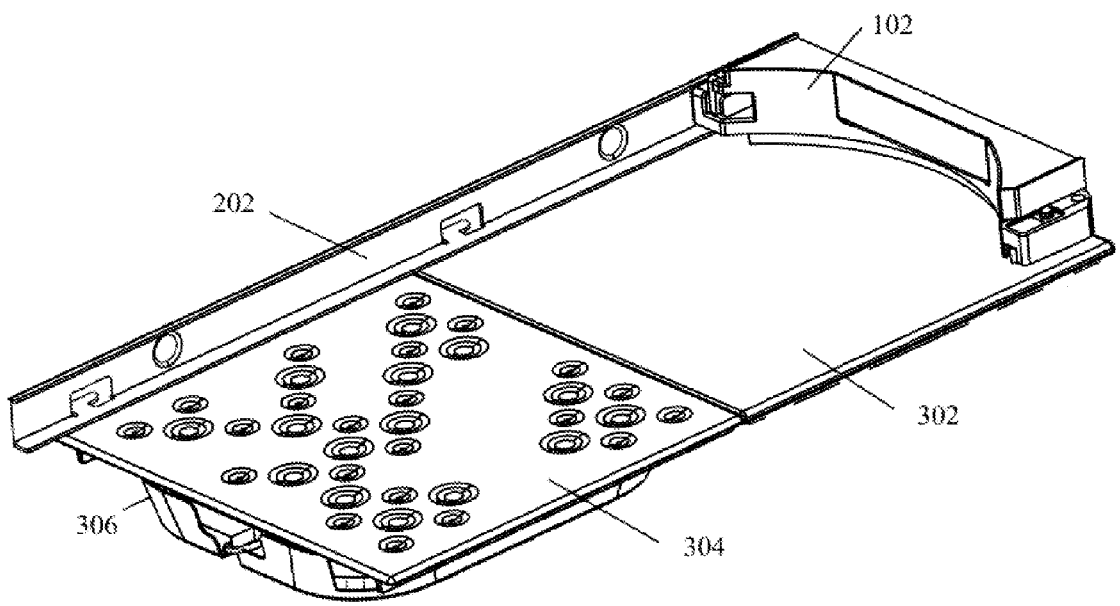
FIG. 3 shows the assembly of the kicker, slide bar and the dual platen in a typical configuration.
Figure 4:
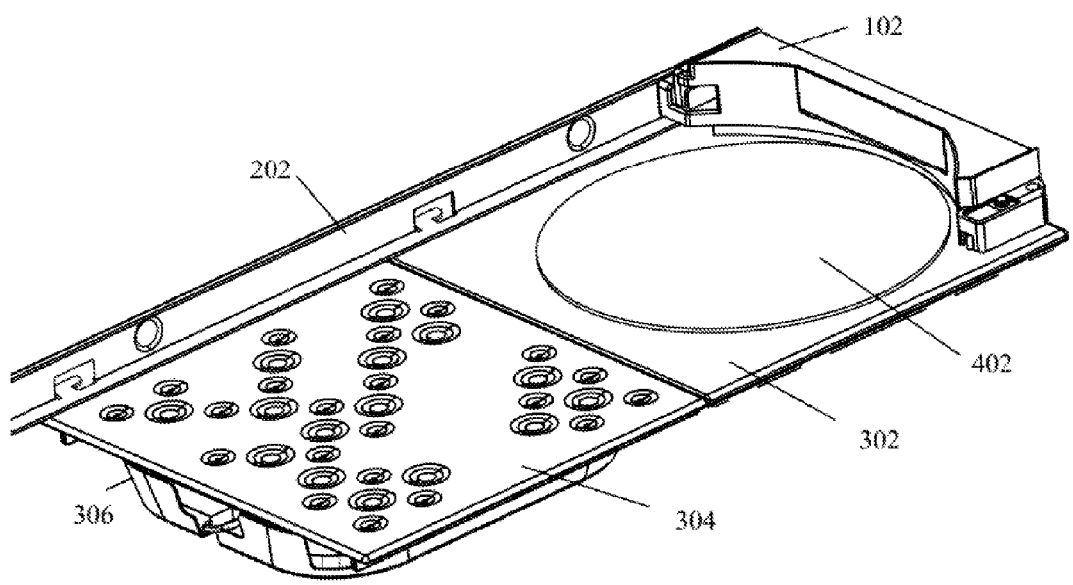
FIG. 4 shows the flattened dough is residing in the first platen with kicker and rest of the assembly.

FIG. 3 shows the assembly of the kicker, the linear system and the first platen 302 and the second platen 304. The heating element enclosing 306 for the second cooking platen 306. FIG. 4 shows flattened dough 402 is located on the first platen 302 and is waiting to be processed. The kicker 102 is in the initial position and is touching the flattened dough to measure the first resistance and to calculate its next motor movement calculation.

Figure 6:
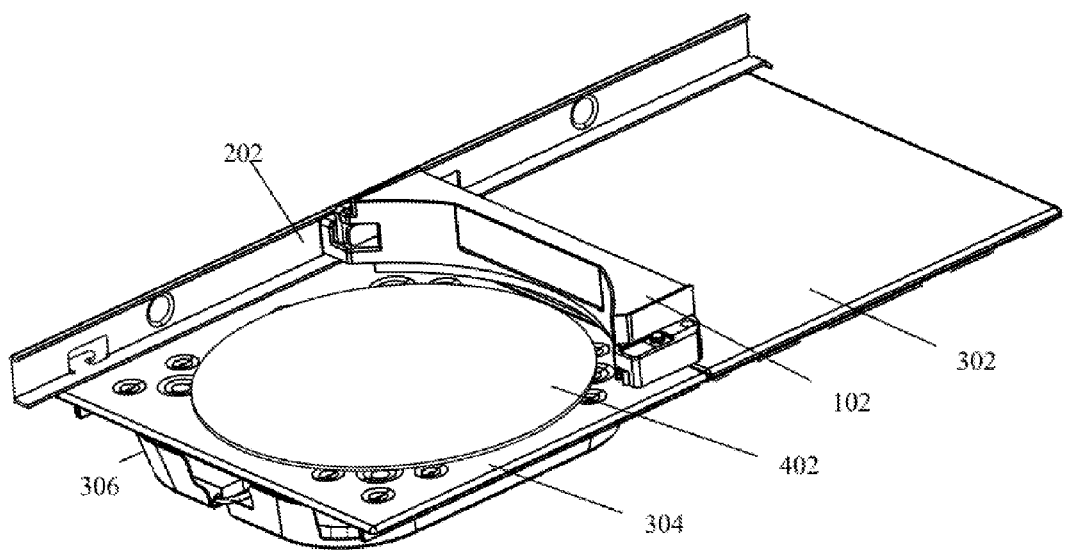
FIG. 6 show that the kicker has pushed the flattened dough to the final position for cooking.
Figure 5:
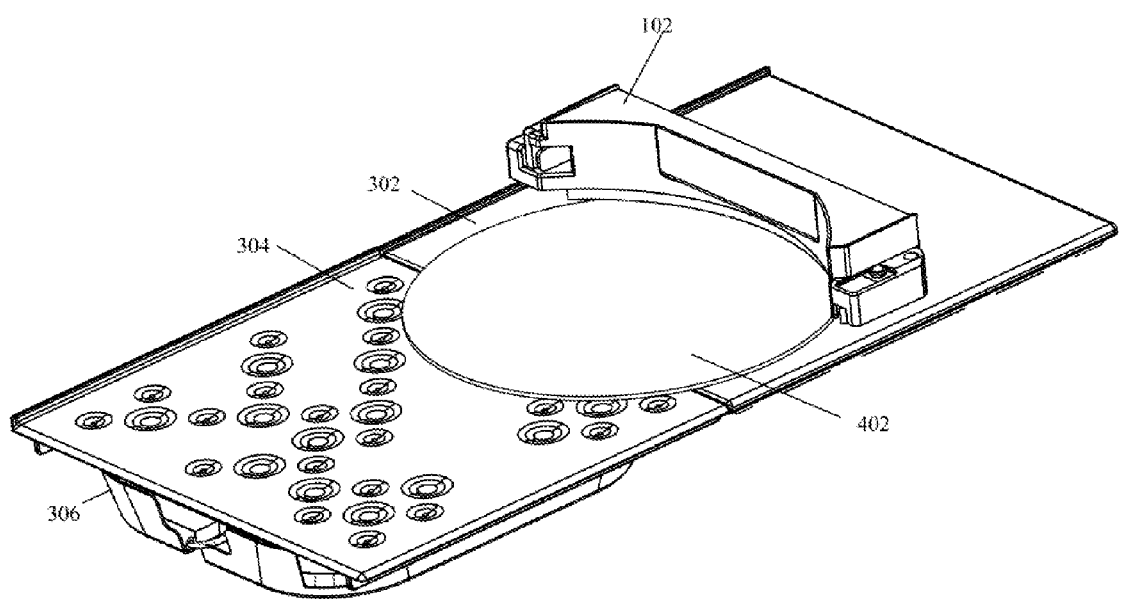
FIG. 5 show the kicker is in mid-way position and the flat dough is partially transferred to second platen.

Referring to FIG. 4 the motor provides low power to kicker 102 over a short duration of time to nudge the flattened dough. As low powered is being supplied to kicker 102, kicker 102 contacts the flattened dough with minimal force. Furthermore, kicker 102 moves only a small distance. The objective here in this step is not to displace the flattened dough, but to detect if there is sticking. If sensors detect that the flattened dough has not been displaced after this nudge, this means that there is stickiness. Once stickiness has been detected, built-in software (on a processor) calibrates the motor to increase its power to kicker 102 to displace the flattened dough as well as to compensate for the sticking. This means that sufficient power must be applied to kicker 102 such that kicker 102 can apply sufficient force to displace or transport the dough product over the required distance, as well as to dislodge the dough product which is stuck to a surface. As shown in FIG. 5 and FIG. 6, kicker 102 moves over a longer distance. In FIG. 6 the flattened dough 402 is completely situated on the second platen 304 which is a cooking platen. The flattened dough is cooked to make cooked flat bread for consumption at this stage.

The novel method and system for using this apparatus with a kicker unit that includes the kicker and the linear system that makes the kicker travel the length of the two platens is controlled by a self-guiding software and method. The dough ball is made up of flour and water. There is some amount of moisture in the dough ball when made. Each type of flour has its own unique characteristic to react to kneading when water is added to it. In the first platen unit (not shown) the dough ball is compressed to make flattened dough.

A method of using a kicker unit comprises of initializing the kicker unit having that houses a sensor, a motor and a curved kicker to a first position to calibrate a start position using the motor; moving the kicker unit to a second position to touch a flattened dough with the curved kicker to assess a specific stickiness using the sensor; and calculating the stickiness of the flattened dough to recalibrate a motor movement to move the flattened dough from a position one to position two after a sensor feedback. Modulation of the motor movement is done if the stickiness is at least one of a least resistance and a most resistant. If the stickiness is of the least resistance then the motor needs very little power to move the flattened dough and draws less current. If the stickiness is of resistance level then the first platen is heated a bit to reduce the moisture, in turn the stickiness, and then an increased force is applied by the motor to the kicker unit to move the flattened dough from first position to final position. If the resistance still exists and the sensor records that the kicker has not moved on the linear system and the motor is drawing more power than allocated then the process is aborted and the system sends message for display saying the machine needs to be cleaned.

The kicker unit moves and has a repeat movement for moving of the flattened dough to reach the final position for cooking if the second movement does not enable to reach the final position. The resistance is measured by the kicker after pushing the flattened dough and if a threshold of resistance is reached the kicker unit moves back to position one and informs the system for corrective action. All the movement and reading from the sensor and linear motor is used for calculating the calibration of the distance the curved kicker needs to travel using software that resides on a processor.

Although the present embodiments have been described with reference to specific example embodiments, it will be evident that various modifications and changes may be made to these embodiments without departing from the broader sprit and scope of the various embodiments. Accordingly, the specification and drawings are to be regarded in an illustrative rather than a restrictive sense.

What is claimed is:

1. A kicker unit, comprising: a kicker comprising of a motor, sensor, back support and a curved kicker having a specific shape and a specific surface is used to contact a flattened dough that needs to be located at a specific location from
    a flattening platen to a cooking platen unit; and
    a linear system attached to the kicker housing a rail, an actuator and an encoder that measures at least one of a resistance and change in rate of motion of the flattened dough during a forward and backward movement of the kicker, and
    a processor housing_a software to calibrate the power of the motor and the distance of the kicker for forward and backward movement to move the flattened dough to the cooking platen unit.

2. The kicker unit of claim 1, wherein the specific shape of the curved kicker enables a curved flattened dough to be moved.

3. The kicker unit of claim 1, wherein the specific surface is heat resistant and non-stick in nature.

4. The kicker unit of claim 1, wherein the specific location is right in the center of the cooking platen.

5. The kicker unit of claim 1, wherein the resistance is due to stickiness of the flattened dough.

6. The kicker unit of claim 1, wherein the kicker unit is detachable for ease of use.

7. A method of using a kicker unit, comprising; initializing the kicker unit having that houses a sensor, a motor and a kicker to a first position to calibrate a start position using the motor;
    moving the kicker unit to a second position to nudge a flattened dough with the kicker to assess a specific stickiness using the sensor;
    calculating the stickiness of the flattened dough to recalibrate a motor power to move the flattened dough from a position one to position two after a sensor feedback using a software residing in a processor; and
    modulating and calibrating the motor power for the kicker movement if the stickiness is at least one of a least resistance and a more resistance.

8. The method of using the kicker unit as in claim 7 further comprising: increasing the motor power after the sensor feedback to move the kicker to push the flattened dough if the specific stickiness is at a level of the more resistance.

9. The method of using the kicker unit as in claim 7, further comprising:
    contacting the flattened dough with the kicker using a repeat movement and moving it from a position two to a final position for cooking.

10. The method of using the kicker unit as in claim 8, further comprising:

moving the kicker unit to have a repeat movement for moving of the flattened dough to reach the final position for cooking if the second movement does not enable to reach the final position.

11. The method of using the kicker unit as in claim 7, further comprising:

measuring the resistance of the flattened dough and if a threshold is reached the kicker unit moves back to position one and informs the system for corrective action.

\* \* \* \* \*